2,816,079

ALUMINA AEROGEL AND PROCESS OF PREPARING SAME

John F. White, Medford, Mass., assignor to Monsanto Chemical Company, St. Louis, Mo., a corporation of Delaware No Drawing. Application March 29, 1952,
Serial No. 279,469

11 Claims. (Cl. 252—317)

The present invention relates to novel alumina aerogels, to stable aqueous colloidal dispersions or solutions of such aerogels and to methods of preparing such aerogels.

It has been proposed heretofore to prepare alumina aerogels by first dissolving aluminum nitrate containing water of crystallization in methyl alcohol, cooled to about 10° C. and stirred vigorously, while adding aniline. The resulting mixture is allowed to attain room temperature at which time a firm jelly is formed which jelly can be extracted with methyl alcohol until it is free of aniline and salts. The resulting alcohol-aluminum hydroxide jelly or alcogel is then heated in a pressure vessel until the liquid in the gel has reached a temperature at which the surface tension of the liquid is so small as to produce no substantial shrinkage of the gel when the liquid is allowed to evaporate, after which such temperature is maintained in the vessel and vapor is released at a rate insufficient to injure the gel. The alumina aerogel produced by the foregoing method is useful for certain purposes, but it has several disadvantages. Thus, the prior art alumina aerogel is not water-dispersible and cannot be dispersed in water by simple stirring to form a stable, colloidal solution. This non-dispersibility of the prior alumina aerogel in water limits its utility in that it cannot be used conveniently or practically in aqueous coating compositions or in certain textile applications.

In accordance with the present invention, on the other hand, it is possible to produce water-dispersible alumina aerogels, that is alumina aerogels which may be colloidally dispersed in water by simple stirring to form stable, colloidal dispersions or solutions. It is also possible in accordance with this invention to provide stable, colloidal dispersions or solutions of alumina aerogels which solutions differ in properties and uses from aqueous alumina sols produced by prior art processes.

It is one object of this invention to provide novel, water-dispersible alumina aerogels.

It is a further object of this invention to provide stable, aqueous colloidal dispersions or solutions of alumina aerogels having unique properties.

It is a further object of this invention to provide a novel method for the preparation of alumina aerogels.

Still further objects and advantages of this invention will become apparent from the following description and appended claims.

The methods of this invention are carried out, in general, by first contacting an aqueous solution of aluminum chloride with an amount of ethylene oxide sufficient to form a mixture of colloidally dispersed alumina and ethylene chlorhydrin which gels on standing. After the alumina hydrogel is formed, the gel is washed with a water-miscible organic liquid to remove substantially all of the ethylene chlorhydrin formed by the reaction of the aluminum chloride and ethylene oxide, and to replace a substantial portion of the water in the gel with such organic liquid. The washed gel is then heated under superatmospheric pressure in a pressure-resistant vessel until the temperature of the liquid in the gel exceeds the critical temperature of such liquid. Vapors are released from the pressure vessel, as required, and at a rate insufficient to injure the original gel structure. By carrying out the foregoing process until substantially all vapor is released, it is possible to prepare transparent aulmina aerogels which are colloidally dispersible in water with simple stirring to form stable, substantially neutral, aqueous colloidal dispersions or solutions.

In carrying out the methods of this invention it is possible to vary to some extent the concentrations and relative quantities of the reactants, the operating temperatures and other factors without effecting the operability of the process. For example, the concentration of the aqueous aluminum chloride solution used in preparing the alumina hydrogel may be varied widely and is only restricted on the one hand by the solubility of aluminum chloride in water at the operating temperature and on the other hand by the minimum concentration of aluminum chloride which will provide a gel forming mixture when mixed with ethylene oxide. For the formation of practical alumina hydrogels, it is desirable to use an aqueous solution containing from about 8 to 31% by weight of $AlCl_3$, and preferably between 10 and 25% by weight of $AlCl_3$.

The relative proportions of ethylene oxide to aluminum chloride used in forming the alumina hydrogel may be varied to some extent. However, it is preferred to use sufficient ethylene oxide to produce a mixture which sets to a hard gel, since hard gels may be processed more efficiently than the soft gels which are obtained when minimum amounts of ethylene oxide are employed. Moreover, it is preferred not to use excessive quantities of ethylene oxide since if too much ethylene oxide is used the final alumina aerogel is only dispersible in water at low concentrations which limits its value in certain fields of use. Best results are obtained by using sufficient ethylene oxide to react with at least 90% of the aluminum chloride, but not in excess of 4 mols of ethylene oxide per mol of aluminum chloride. By using these concentrations of ethylene oxide to aluminum chloride it is possible to prepare hydrogels which may be converted to an alumina aerogel capable of being colloidally dispersed in water with simple stirring in concentrations of at least 5% by weight.

The aqueous solution of aluminum chloride may be contacted with ethylene oxide in a pressure-resistant vessel at superatmospheric pressure, that is, absolute pressures above 760 millimeters of mercury, in which case it is possible to employ gaseous ethylene oxide. However, it is preferred for reasons of economy and ease of control to initially contact the aqueous solution of aluminum chloride with liquid ethylene oxide at atmospheric pressure and at temperatures below the boiling point of liquid ethylene oxide at atmospheric pressure and above the freezing point of the aluminum chloride solution. Temperatures between about 0 and 8° C. have been found to be especially suitable for this purpose. After the mixture of liquid ethylene oxide and the aqueous solution of aluminum chloride is formed, the mixture is preferably maintained below the boiling point of ethylene oxide at atmospheric pressure by cooling, if necessary, until a substantial portion of the ethylene oxide has reacted with the aluminum chloride. After this the temperature of the solution may be allowed to rise to the ambient temperature of the atmosphere or as high as 30 to 40° C. until a hydrogel is formed. The reaction between the aluminum chloride and ethylene oxide is quite slow and since the reaction is exothermic some heat is liberated. The time required to form a hydrogel under the above conditions will vary depending on the temperature of the mixture, the concentration of the aluminum chloride and the relative proportions of $AlCl_3$ to ethylene oxide used. However, in most instances gelation occurs within a period of about 2 to 6 hours after the formation of a homogeneous mixture of the ethylene oxide and the aqueous solution of aluminum chloride.

The alumina hydrogel formed by the above described procedure must be washed substantially free of the ethylene chlorohydrin formed by the reaction between aluminum chloride and ethylene oxide before formation of an alumina aerogel of good quality can be carried out. The hydrogel may be washed at any stage after its formation, but to facilitate ease of removal of the ethylene chlorhydrin it is preferred to allow the hydrogel to age so that it will attain maximum practical hardness, after which the hydrogel is preferably broken into lumps. The hydrogel cannot be washed with water as it will disintegrate and lose its gel structure. It has been presently found necessary to wash the hydrogel with a water-miscible organic liquid, preferably a water-miscible organic liquid having a critical temperature considerably below the critical temperature of water. On washing the hydrogel with such liquid the ethylene chlorhydrin is gradually removed from the gel and the water in the gel is gradually replaced by the organic liquid. The washing or extraction of the hydrogel is continued until all or substantially all of the ethylene chlorhydrin is removed from the gel. The resulting gel may be designated an alumina organogel by virtue of the fact that the liquid phase of the gel consists substantially of the organic liquid used in removing the ethylene chlorhydrin. The washings or extractions obtained from the gel may be processed in various ways to separate the organic liquid and the ethylene chlorhydrin. This may be done, for example, by fractional distillation or the like. The organic liquid may then be used for washing or extracting additional quantities of hydrogel.

A large variety of water-miscible organic liquids may be used for extracting or washing the hydrogel, including the lower monohydric alcohols such as methanol, ethanol, propanol and the like, ketones such as acetone, methyl ethyl ketone and the like and methyl acetate and the like. The low boiling liquids having a critical temperature below 374° C., and particularly below 300° F., are preferred. Of the various organic liquids which may be used ethanol and methanol are preferred because of their low cost and their low critical temperature, and also because they do not form objectionable by-products.

In preparing the alumina aerogels of this invention from the alumina organogels hereinbefore described it is possible to use various procedures. One particularly suitable procedure comprises first charging the organogel to a pressure-resistant vessel such as an autoclave in an amount sufficient to occupy at least 50% of the volume of such vessels, alone or in the presence of added organic liquid, until the liquid in the gel has reached a temperature at which the surface tension of the liquid is so small as to produce no substantial shrinkage of the gel when the liquid is allowed to evaporate. The gel is then maintained at least at such temperature and vapor is released from the vessel at a rate insufficient to injure the gel structure. The above procedure for converting an organogel to an aerogel is described in greater detail in the Kistler Patent No. 2,093,454 issued on September 21, 1937.

Another particularly suitable procedure for converting the alumina organogels to an aerogel comprises first charging the organogel to a pressure-resistant vessel such as an autoclave in an amount sufficient to occupy from 90% to substantially all of the volume of the vessel after which the contents of the vessel are heated and the pressure is allowed to increase to or above the critical pressure of the liquid present in the gel. When this is reached, the pressure is maintained at the selected point by releasing portions of the liquid from time to time as the pressure tends to rise, and the heating is continued until the critical temperature has been reached or passed. The liquid, which has by this time been converted into gaseous form, is allowed to escape from the vessel. The foregoing procedure for converting an organogel to an aerogel is described in greater detail in the Kistler Patent No. 2,249,767, issued on July 22, 1941.

Of course the liquid or vapors of the liquid which are released from the pressure resistant vessel or autoclave to control the pressure may be recovered by conventional means and used for washing or extracting further quantities of the hydrogel.

In heating or autoclaving the alumina organogel as described above it is apparent that the temperatures and pressures employed will vary considerably depending primarily on the critical temperature and critical pressure of the organic liquid in the organogel. In autoclaving an alumina organogel in which ethanol is the organic liquid, satisfactory water-dispersible alumina aerogels are obtained by operating at a pressure between about 1200 and 2000 pounds per square inch (gauge), which is above the critical pressure of the ethanol, the pressure-resistant vessel being maintained at such pressures until the temperature of the contents of the vessel rises above the critical temperature. In the case of ethanol an end temperature of the charge of about 300 to 330° C. is usually attained.

The alumina aerogels produced in accordance with the processes described herein are transparent gels which have substantially the same skeleton structure as the organogels from which they are prepared, but are distinguishable from such organogels in that the space formerly occupied by the organic liquid in the gel structure is occupied by air. Thus, the aerogels of this invention are extremely porous and contain from about 80 to 95% by volume or more of air space based on the volume of the aerogel. Such alumina aerogels are distinguished from the alumina aerogels prepared by the processes of the Kistler patents hereinbefore referred to in that they are water-dispersible and may be dispersed in water in concentrations of 5% or more by simple stirring to form stable, colloidal dispersions or solutions from which no appreciable settling is noted even after long periods of standing or storage, whereas the alumina aerogels of the prior art are not water-dispersible and cannot be colloidally dispersed in water by simple stirring.

A further understanding of the aerogels, compositions and processes of this invention will be obtained from the following specific example which is intended to illustrate this invention but not to limit the scope thereof, parts and percentages being by weight, unless otherwise specified.

*Example*

A solution of aluminum chloride was prepared by adding 38 parts of $AlCl_3.6H_2O$ to 74 parts of water, after which the solution was cooled to 5° C. Twenty-two and four-tenths parts of liquid ethylene oxide (equal to 105% of the theoretical amount required to react with $AlCl_3$) were then added to the aluminum chloride solution with sufficient agitation to form a completely homogeneous solution. The resulting solution was then allowed to stand. On standing the reaction between the aluminum chloride and ethylene oxide progressed slowly as was noted by a gradual warming of the solution due to the heat liberated during the reaction, a temperature of about 15° C. above the ambient temperature being reached in about 3 to 4 hours after the initial mixture was prepared. During this time ethylene chlorhydrin and an alumina hydrogel were formed. The hydrogel was allowed to harden by aging it for a period of at least 16 hours, after which the aged gel was broken up into one-half inch lumps. The gel lumps were washed with a solution containing 5% by volume of water and 95% by volume of ethanol until substantially all of the ethylene chlorhydrin was removed from the gel. The liquid phase then contained at least 90% ethanol.

The washed gel was charged to an autoclave until it occupied about 90% of the volume of the autoclave. The autoclave, which was supplied with a valved vent for releasing vapors, was then closed. Heat was supplied to the autoclave until the pressure inside of the autoclave exceeded the critical pressure of the ethanol, after which heating was continued and vapor was released from the autoclave to maintain the pressure between 1200 and 1500 pounds per square inch (gauge). The autoclave was operated in this manner and heat was supplied until the temperature of the contents of the autoclave exceeded the critical temperature of the ethanol. Additional vapor was released slowly as described until the end temperature of the contents of the autoclave was 320° C. When this temperature was reached the ethanol vapor in the autoclave was vented off through a condenser until the pressure in the autoclave dropped to 0 pounds per square inch (gauge). The contents of the autoclave, that is, the alumina aerogel, were removed and allowed to cool. The resulting aerogel was transparent and very easily comminuted.

A stable colloidal dispersion of the above alumina aerogel was prepared by stirring 5 parts of the alumina aerogel into 95 parts of water at 25° C. for a period of 15 minutes. This dispersion had a whitish opalescence and did not show any signs of gelling or appreciable settling on standing for a period of at least 6 months at room temperature.

The alumina aerogel of this invention may be used for various purposes, for example, as a catalyst, as a support for contact catalysts, as an ultra-filter and as an abrasive. In addition, it has the unexpected utility, as hereinbefore described, of forming stable, colloidal dispersions when stirred with water.

The stable aqueous colloidal dispersion or solutions of the alumina aerogel of this invention may be used in the treatment of textile materials, paper and in various aqueous coating or binding applications where a substantially continuous coating of alumina is desired for ornamental, decorative or protective purposes. The aqueous colloidal dispersions or solutions of the alumina aerogels of this invention are distinguished from the aqueous alumina sols of the prior art, for example, those prepared by acidifying hydrated alumina, in the following respects:

(1) The alumina sols of the prior art are not stable at a pH above 3.6, whereas the colloidal dispersions of alumina aerogels of this invention are stable at a pH above 3.6 and as high as 4.0.

(2) The colloidal dispersions of alumina aerogel of this invention have an opalescent, whitish color and are stable for long periods of time, whereas the alumina sols of the prior art are not stable when they are neutralized to the stage where they have an opalescent, whitish color.

(3) The colloidal dispersions of alumina aerogel of this invention are rendered unstable, resulting in the precipitation of alumina, by the addition of small amounts of acid, whereas the alumina sols of the prior art are rendered more stable by the addition of small amounts of acid.

Various modifications and changes may be made in the aerogel product, compositions and processes of this invention as will be apparent to those skilled in the art to which this invention appertains without departing from the spirit and intent of this invention. Accordingly, it is to be understood that it is not intended to restrict the scope of this invention except by the scope of the appended claims.

What is claimed is:

1. A stable aqueous colloidal dispersion of alumina aerogel, which dispersion is further characterized in that it is stable toward appreciable settling of alumina aerogel particles at a concentration of 5% by weight.

2. A stable, colloidal dispersion of alumina aerogel in water, said dispersion being further characterized in that it is stable toward appreciable settling of alumina aerogel particles, has an opalescent, whitish color, is stable at a pH above 3.6 and as high as 4.0, and is rendered unstable by the addition of a small amount of an acid.

3. A transparent, water-dispersible alumina aerogel containing from about 80 to 95% by volume of air space, based on the volume of the aerogel, and being further characterized by the property of being colloidally dispersible in water with simple stirring at a concentration of 5% by weight to form a dispersion which is characterized in that it is stable toward appreciable settling of alumina aerogel particles at a concentration of 5% by weight, has an opalescent, whitish color, is stable at a pH above 3.6 and as high as 4.0, and is rendered unstable by the addition of a small amount of acid.

4. A stable, colloidal dispersion of alumina aerogel in water, said dispersion being further characterized in that it is stable toward appreciable settling of alumina aerogel particles at a concentration of 5% by weight, has an opalescent, whitish color, is stable at a pH above 3.6 and as high as 4.0, and is rendered unstable by the addition of a small amount of an acid.

5. A method of preparing a water-dispersible alumina aerogel which comprises forming a homogeneous solution of an aqueous solution containing from 8 to 31% by weight of aluminum chloride and an amount of liquid ethylene oxide sufficient to react with at least 90% of said aluminum chloride but not in excess of 4 mols of ethylene oxide per mol of aluminum chloride, at a temperature below the boiling point of liquid ethylene oxide but above the freezing point of the solution, allowing the resulting solution to set to a gel, washing the resulting gel, which contains water, colloidal alumina and ethylene chlorhydrin, with a water-miscible monohydrin alcohol having a critical temperature below the critical temperature of water until substantially all of the ethylene chlorhydrin is removed from the gel, heating the gel in a pressure-resistant vessel until the liquid in the gel has reached a temperature at which the surface tension of the liquid is so small as to produce no substantial shrinkage of the gel when the liquid is allowed to evaporate, maintaining such temperature, and then releasing the vapor from the pressure-resistant vessel at a rate insufficient to injure the gel structure.

6. A method according to claim 5, but further characterized in that the organic liquid is ethanol.

7. A method according to claim 5, but further characterized in that the organic liquid is methanol.

8. A method according to claim 5, but further characterized in that the organic liquid is propanol.

9. A method of preparing a water-dispersible alumina aerogel which comprises forming a homogeneous solution of an aqueous solution containing from about 10 to 25% by weight of aluminum chloride and liquid ethylene oxide in an amount sufficient to react with at least 90% of said aluminum chloride but not in excess of 4 mols of ethylene oxide per mol of aluminum chloride, said aqueous solution of aluminum chloride being at a temperature below the boiling point of ethylene oxide but above the freezing point of the solution, allowing the homogeneous solution to set to a gel containing water, colloidal alumina and ethylene chlorhydrin, washing the resulting gel with ethanol until substantially all of the ethylene chlorhydrin is removed from the gel, charging the gel to a pressure-resistant vessel in an amount sufficient to occupy at least 50% of the volume of said vessel, heating the gel in said vessel until the pressure in the vessel is at least equal to the critical pressure of ethanol, continuing heating of the gel, while releasing ethanol vapors from the vessel to maintain the pressure in the vessel between 1200 and 2000 pounds per square inch (gauge), until the temperature of the gel exceeds the critical temperature of the ethanol, and thereafter releasing ethanol vapors from the vessel until the pressure in the vessel is 0 pounds per square inch gauge, while maintaining the temperature of the gel above the critical temperature of the ethanol.

10. A method of preparing a water-dispersible alumina aerogel which comprises contacting an aqueous solution of from 8 to 31% by weight of aluminum chloride with an amount of ethylene oxide sufficient to form a mixture of colloidal alumina and ethylene chlorhydrin which is capable of gelling on standing, allowing the resulting mixture to gel, extracting the gel with a water-miscible organic liquid having a critical temperature below the critical temperature of water until substantially all of the ethylene chlorhydrin is removed from the gel, heating the resulting organogel in a pressure-resistant vessel under superatmospheric pressure until said organic liquid in the gel has reached a temperature at which the surface tension of said liquid is so small as to produce no substantial shrinkage of the gel when said liquid is allowed to evaporate, maintaining such temperature, and releasing vapor from the pressure-resistant vessel at a rate insufficient to injure the gel structure.

11. A method of preparing a water-dispersible alumina aerogel which comprises contacting an aqueous solution of from 8 to 31% by weight of aluminum chloride with an amount of liquid ethylene oxide sufficient to form a mixture of colloidal alumina and ethylene chlorhydrin which is capable of gelling on standing, allowing the resulting mixture to gel, washing the gel with a water-miscible monohydric alcohol having a critical temperature below that of water until substantially all of the ethylene chlorhydrin is removed from the gel, heating the resulting organogel which contains said alcohol in a pressure-resistant vessel under superatmospheric pressure until the temperature of said alcohol in the gel exceeds the critical temperature of said alcohol and releasing the vapor of said alcohol from said vessel at a rate insufficient to injure the gel structure.

References Cited in the file of this patent

UNITED STATES PATENTS

| | | |
|---|---|---|
| 1,951,718 | Ziese et al. | Mar. 20, 1934 |
| 2,093,454 | Kistler | Sept. 21, 1937 |
| 2,188,007 | Kistler | Jan. 23, 1940 |
| 2,373,198 | Roehrich | Apr. 10, 1945 |
| 2,405,275 | Stowe | Aug. 6, 1946 |
| 2,560,707 | Stark | July 17, 1951 |